(12) United States Patent
Constantinides

(10) Patent No.: US 6,177,171 B1
(45) Date of Patent: Jan. 23, 2001

(54) SHEAR FORCE MODULATION SYSTEM

(75) Inventor: George P. Constantinides, San Antonio, TX (US)

(73) Assignee: Salix Medical, Inc., San Antonio, TX (US)

( * ) Notice: Under 35 U.S.C. 154(b), the term of this patent shall be extended for 0 days.

(21) Appl. No.: 09/109,669

(22) Filed: Jul. 2, 1998

(51) Int. Cl.$^7$ ........................................... B32B 3/06
(52) U.S. Cl. ..................... 428/101; 428/198; 428/212; 428/223
(58) Field of Search ................... 428/198, 212, 428/223, 101

(56) References Cited

U.S. PATENT DOCUMENTS

| | | | |
|---|---|---|---|
| Re. 29,766 | 9/1978 | Wideman | 128/132 D |
| 2,254,883 | 9/1941 | Boyle | 128/156 |
| 3,884,225 | 5/1975 | Witter | 128/133 |
| 3,985,130 | 10/1976 | Wideman | 128/132 R |
| 4,572,174 | 2/1986 | Eilender et al. | 128/149 |
| 4,649,586 | 3/1987 | Wu | 12/146 B |
| 4,657,021 | 4/1987 | Perry et al. | 128/630 |
| 4,700,403 | 10/1987 | Vacanti | 2/2 |
| 4,845,861 | 7/1989 | Moumdjian | 36/29 |
| 4,864,740 | 9/1989 | Oakley | 36/44 |
| 4,939,852 | 7/1990 | Brenner | 36/44 |
| 5,012,801 | 5/1991 | Feret | 128/155 |
| 5,019,064 | 5/1991 | Eilender | 604/378 |
| 5,101,580 | 4/1992 | Lyden | 36/93 |
| 5,128,209 | 7/1992 | Sakai et al. | 428/421 |
| 5,154,682 | 10/1992 | Kellerman | 36/44 |
| 5,188,124 | 2/1993 | Feret | 128/889 |
| 5,203,793 | 4/1993 | Lyden | 36/88 |
| 5,514,459 | 5/1996 | Blauer et al. | 428/246 |
| 5,555,584 | 9/1996 | Moore, III et al. | 12/142 N |
| 5,586,398 | 12/1996 | Carlson | 36/114 |
| 5,609,569 | 3/1997 | Offenhantz | 602/61 |
| 5,625,965 | 5/1997 | Blisset et al. | 36/43 |

*Primary Examiner*—Elizabeth M. Cole
(74) *Attorney, Agent, or Firm*—Jenkens & Gilchrist, A Professional Corporation

(57) ABSTRACT

A shear force modulation system comprising an upper pad to which an upper slide is attached, and a lower pad to which a lower slide is attached, the top surface of the upper pad being adapted for contact with the skin surface and the bottom surface of the lower pad being adapted for contact with a skin abrasive surface. The upper slide is in slidable contact with the lower slide, and the upper and lower pads may be attached by coating, adhesives, and elastic, viscoelastic, or non-elastic connectors. The system may be adapted for use as an insole, bed pad, or other device which is used to modulate shear forces applied to a skin surface and thus reduce abrasion and ulceration. Time varying response to shear may also be provided by retaining a viscoelastic fluid between the upper and lower pads, or slides. Variable compliance to modulate shear forces may be provided by the application of connectors in various configurations.

30 Claims, 4 Drawing Sheets

SHEAR FORCE MODULATION SYSTEM

BACKGROUND OF THE INVENTION

1. Technical Field

This invention relates generally to an apparatus for the modulation of shear forces applied to a skin surface. More particularly, the instant invention relates to a multi-layer system of materials which, when applied directly to a skin surface, modulates shear forces which would otherwise be applied thereto and thereby increases or decreases such forces as desired.

2. History of Related Art

Many of the tasks undertaken on a daily basis require the human body to be physically contacted by various surfaces. When such contact takes on a repetitive nature, the skin draws on its natural resources to thicken and eventually, over a period of time, a callous may be produced. However, some activities are so abrasive, or conducted over such a short period of time, that these natural defenses have insufficient time to develop. In such cases, protective clothing such as shoes or gloves may be worn. However, such measures may also be insufficient to prevent the formation of blisters, ulcers, etc. In addition, bony prominences beneath the skin and other conditions lend themselves to perforation or ulceration of the outer skin layers when constantly contacted by coverings which are supposed to protect these areas, such as mattresses, mattress covers and bed sheets. In every case, it is the shear force applied to the skin surface which results in surface degradation. This problem makes itself known in the form of bed sores, ulcerations, bunions, blisters, and other physical manifestations symptomatic of excessive shear force, caused by excessive friction or reduced synthetic surface compliance, applied to the skin surface.

On the other hand, it is at times desirable to increase the magnitude of such shear forces by providing increased friction between the skin surface and whatever it contacts. A good example of this circumstance exists in the area of track and field competition, wherein sprinters require the maximum amount of friction between their forefoot and the insole of the running shoe to gain the maximum amount of acceleration in the shortest possible time. Other examples of demanding increased friction include the use of pine tar for application to batter's gloves, or other substances, as used in golf, and tennis, or any time that an athlete desires to gain greater control over an implement having a grip.

Several attempts have been made to address the problem of shear force reduction, most of these being in the area of reducing shear force, or its practical elimination. One example is found in U.S. Pat. No. 5,586,398, issued to Carlson, which discloses a shoe having a friction management interface built into the insole. The design is intended to reduce friction during heel strike, and increase friction on push-off. The amount of friction between the user's foot and the shoe is controlled by interaction between the sock surrounding the foot and an insert. However, this reference does not teach the use of shear force modulation through the use of friction management with directional control, or the use of materials which create a varying time/displacement response to shear forces.

U.S. Pat. No. 5,154,682, issued to Kellerman, describes a low-friction shoe insert made of polyethylene, which is bonded to the insole. However, in every embodiment taught by this reference, direct application of the foot sole onto slippery polyethylene is required.

A different approach to shear force reduction is disclosed by U.S. Pat. No. 2,254,883, issued to Boyle, which speaks to a protective pad having an adhesive strip onto which are applied three sheets of thin, smooth material. The outer layer of smooth material is applied against the skin, while the adhesive strip serves to hold the multi-layer arrangement in place. However, this device does not demonstrate the controlled use of friction or compliance to modulate shear forces with respect to direction, time, or magnitude.

A similar attempt is revealed in U.S. patent application Ser. Nos. 4,572,174 and 5,019,064, issued to Eilander et al., which describe a bed pad structure having a stationery lower layer bonded to a slippery top layer, with a fluid lubricant inserted therebetween. The slippery layer is porous, and is to be placed in contact with the skin. However, this device does not teach the use of a slippery interface between two high-friction surfaces, with the controlled modulation of shear forces.

One of the areas exhibiting a long-felt need for a shear force modulation system is that of insoles. Currently, over-the-counter insoles are made from a variety of single, double and triple layer combinations of viscoelastic materials. For the most part, competitors in the market attempt to separate themselves from rivals by unusual color and material combinations, as well as other marketing gimmicks, as opposed to effective material combinations which provide results due to their physical interaction. Available insoles help to reduce peak focal pressures measured between the foot and the insole, but none has been developed that modulates shear forces.

Therefore, what is needed is a shear force modulation system which provides precise control over shear forces applied to the skin, including time-response, quantity or magnitude of shear force, and directional control of shear force. In addition, such a device would be further enhanced by acting to reduce peak pressures (i.e., those forces applied in a vertical or normal direction to the skin surface, such as the impact forces on a foot engaged in walking or running).

SUMMARY OF THE INVENTION

In the preferred embodiment of the present invention, a shear force modulation system is achieved by controlling friction and/or compliance. A shear force modulation system which controls friction may comprise an upper pad having a top surface adapted for contact with a skin surface and a bottom surface spaced from the top surface of the upper pad; an upper slide having a top surface and a bottom surface, the top surface of the upper slide attached to or in contact with the bottom surface of the upper pad; a lower slide having a top surface and a bottom surface, the top surface of the lower slide slidably contacting the bottom surface of the upper slide; and a lower pad having a top surface and a bottom surface, the top surface of the lower pad attached to or in contact with the bottom surface of the lower slide, the bottom surface of the lower pad being spaced from the top surface of the pad and adapted for contact with a skin abrasive surface. The upper pad of the shear modulation system may be attached or elastically bound to the lower pad and the upper and lower slides may be attached or elastically bound to the upper and lower pads, respectively. Also, the upper pad may be attached to the upper slide, and the lower pad may be attached to the lower slide, each by an elastic bond. Attachment may also occur by having the slides integrally formed with their respective pads, such that the upper pad and slide form an integral unit, and the lower pad and slide form an integral unit, wherein the individual components (i.e. pads and slides) are practically inseparable, the pads are coated with the slide material, or the components are visibly indistinguishable from each other. Additionally, any number of pads or slides can be attached to, bound to, integrated with or in contact with, each other in any combination.

A shear force modulation system which controls compliance may be comprised of connectors which are used to attach the pads and slides to each other. Compliance is defined as the ease of movement between the upper and lower pads independent of friction. As the upper and lower pads move relative to each other, the connectors will either stretch or contract, and therefore will increase or decrease compliance. This will change the compliance of the pad due to the reactive force developed by the connectors. The connectors can be made of elastic (with varying elastic constants), viscoelastic, or non-elastic materials, or any combination. By having the connector bonds or attachments pre-loaded, non-loaded, or slack, the compliance of the pad can also be controlled. For example: In an elastic pre-loaded case, the connectors will have some initial resistance force which increases as the connectors are stretched. In an elastic non-loaded case, the connectors will have no initial resistance force, but such a force will appear and then increase as the connector is stretched. In an elastic slack case, the connectors will have no initial resistance force; only after enough displacement has occurred to take up the slack in the connectors will the force appear and then increase as the connector stretches. The effects of elastic connectors depends on the relative displacement between the upper and lower pad; the effect of viscoelastic connectors also depends on the relative velocity between the pads.

The shear modulation system may also be adapted for use as a pressure reducer, in the normal direction to the pads, with the use of a cushioned upper and/or lower pad. This will help reduce compressive forces on the skin surface. The upper and/or lower pads may be adapted for use as an insole, and the upper and/or lower pads may also comprise a wear indicator which will verify if the system is still functioning properly. Movement between the skin surface and the pad may then be seen as wear on the upper pad, indicating the pad is not reducing shear internally, due to a relative displacement change between the upper pad and the skin surface.

In another aspect of the preferred embodiment of the present invention, a first coefficient of friction between the skin surface and the top surface of the upper pad may be greater than a second coefficient of friction between the bottom surface of the upper slide and the top surface of the lower slide, while a third coefficient of friction between the bottom surface of the lower pad and the skin abrasive surface may be greater or less than the second coefficient of friction. However, the first coefficient of friction between the skin surface and the top surface of the upper pad may also be less than the second coefficient of friction between the bottom surface of the upper slide and the top surface of the lower slide, while the third coefficient of friction between the bottom surface of the lower pad and the skin abrasive surface may be greater or less than this second coefficient of friction.

In still another aspect of the preferred embodiment of the present invention, a viscoelastic fluid may be continuously maintained between the upper and lower pads, and the lower surface of the upper slide and the upper surface of the lower slide may be adapted for bidirectional or unidirectional slidable engagement.

In yet another aspect of the preferred embodiment of the present invention, a first group of nodules in the shear force modulation system may be fixedly attached to the top surface of the bottom slide and a second group of nodules may be fixedly attached to the bottom surface of the top slide. The nodules may be different sizes, or shapes, and the number of nodules may be varied to achieve the desired shear force modulation.

In still another aspect of the preferred embodiment of the present invention, a first coefficient of friction within a first region between the bottom surface of the upper slide and the top surface of the lower slide may be greater than a second coefficient of friction within a second region between the bottom surface of the upper slide and the top surface of the lower slide. The first coefficient of friction during movement along a first path between the bottom surface of the upper slide and the top surface of the lower slide may also be greater than a second coefficient of friction during movement along a second path between the bottom surface of the upper slide and the top surface of the lower slide.

In yet another aspect of the preferred embodiment of the present invention, the time required to develop a predetermined magnitude of a first coefficient of friction within a first region between the bottom surface of the upper slide and the top surface of the lower slide may be greater than the time required to develop a predetermined magnitude of a second coefficient of friction within a second region between the bottom surface of the upper slide and the top surface of the lower slide.

BRIEF DESCRIPTION OF THE DRAWINGS

A more complete understanding of the structure and operation of the present invention may be had by reference to the following detailed description when taken in conjunction with the accompanying drawings, wherein.

DETAILED DESCRIPTION OF THE PRESENTLY PREFERRED EXEMPLARY EMBODIMENT

Figure 1:
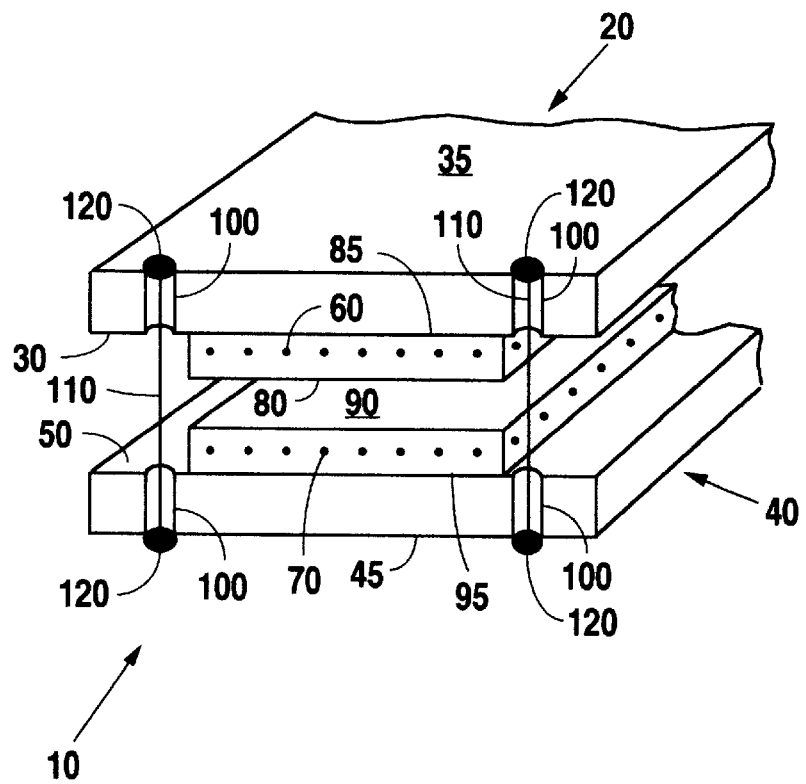
FIG. 1 is a perspective cut-away view of the present invention.

Turning now to FIG. 1, a cut-away view of the present invention, in perspective, can be seen. The shear force modulation system 10 for friction control comprises an upper pad 20 and a lower pad 40, between which an upper slide 60 and a lower slide 70 are retained. Typically, the upper pad top surface 35 is placed in direct contact with a skin surface, which can be either human or animal. The upper pad bottom surface 30 contacts the upper slide top surface 85. The upper slide bottom surface 80, in turn, contacts the lower slide top surface 90, while the lower slide bottom surface 95 contacts the lower pad top surface 50. Finally, the lower pad bottom surface 45 normally contacts a skin abrasive surface (not shown), which may comprise any of a number of common surfaces to which the skin surface would otherwise be directly exposed. Typical skin abrasive surfaces include insoles of shoes, mattress covers or sheets, wheelchair seat pads, the inside surfaces of gloves, all types of hand grips, the portion of a crutch which is received under the arm, nose and ear contact points on eyeglasses, and any other item or device which may be in contact with a skin surface. Such contact is most likely to be abrasive where the contact period is extended, where fluid is introduced between the skin surface and the abrading surface (i.e., sweating), or when shear forces are applied to the skin surface-abrasive surface interface. It is the controlled modulation of these shear forces to which the present invention is directed.

In the shear force modulation system 10, the upper pad 20 is typically bound with connectors to the lower pad 40 by means of coatings, adhesives, or elastic, viscoelastic, or non-elastic connectors 110, which may comprise a rubber band, or some other means, such as a fiber or plastic, which deforms in an elastic or viscoelastic manner, tending to return to its original, unstretched, condition. Non-elastic connectors 110, if slack, will simply halt movement in the pads when the slack is removed. The connector 110 is typically attached to the upper pad 20 and lower pad 40 by means of a multiplicity of entry points 100, which extend from the upper pad top surface 35 to the upper pad bottom surface 30, and from the lower pad top surface 50 to the lower pad bottom surface 45. The elastic binders 110 are prevented from escaping the entry points 100 by way of terminations 120. These terminations 120 may comprise knots in the connectors 110, or may be specially formed so as to be larger than the entry points 100. The terminations 120 may also consist of separate elements, for example beads or other objects having holes through which the connectors 110 can be passed and tied off.

Figure 2:
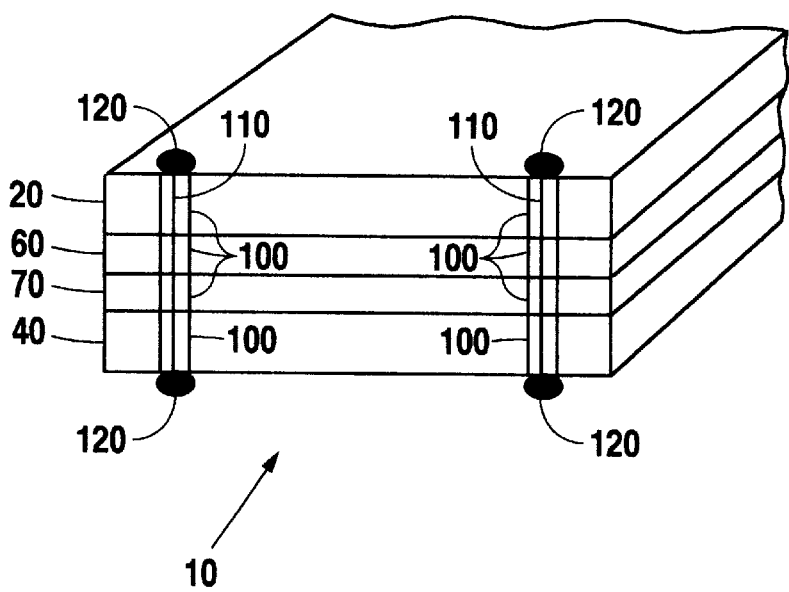
FIG. 2 is a sectioned view of an alternative embodiment of the present invention.

An alternative method of constructing the present invention is shown in FIG. 2, wherein the upper and lower pads 20 and 40 are with connectors 110, as shown in FIG. 1. However, the upper and lower slides 60 and 70 are also elastically bound, both to each other and to the upper and lower pads 20 and 40. In this embodiment, binding the upper and lower slides 60 and 70 to the upper and lower pads 20 and 40 produces a slightly more constrained sliding contact between the upper and lower slide 60 and 70.

Typically, the upper pad 20 is fixedly attached over -its entire surface to the upper slide 60, and the lower pad 40 is also fixedly attached over its entire surface to the lower slide 70. While a fixed attachment does exist in each case between the pad and its respective slide (i.e., 20 and 60, and 40 and 70), this attachment may occur over the entire surface of the slide, or only at a multiplicity of selected points on the surface of the slide. Glues, adhesives, or coatings may be used in lieu of connectors to provide such fixed attachment.

Figure 3:
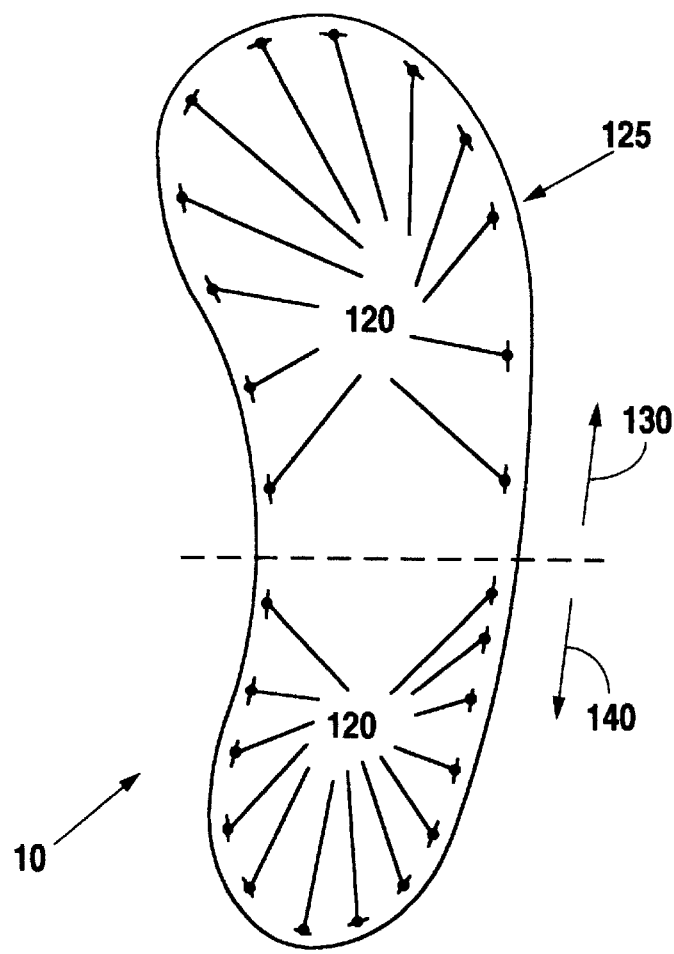
FIG. 3 is a top view of the present invention formed to function as an insole.
Figure 4:
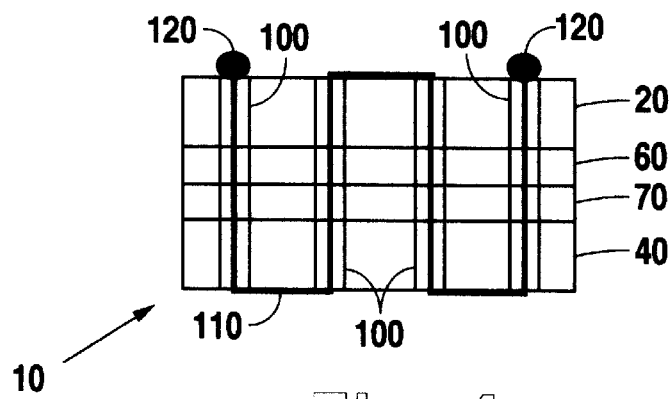
FIG. 4 is a sectioned side view of an alternative embodiment of the present invention.

FIG. 3 illustrates the shear force modulation system 10 of the present invention as formed into the shape of an insole 125, having a forefoot section 130 and a heel section 140. Terminations 120, around the periphery of the forefoot and heel sections 130 and 140 are also shown. This figure shows that the terminations 120 can be allocated along different parts of the periphery of the insole 125 so as to provide a different amount of compliance in the forefoot section 130, as compared with the elasticity of the binding for the heel section 140. These different values of compliance may be achieved by using connectors 110 having a different modulus of elasticity. As shown in FIG. 4, the connector 110 may also follow a serpentine path through the entry points 100, beginning and ending with terminations 120. Further, various binding means, such as rubber cement, contact cement, or other glues, plastic staples, synthetic fibers, polymers, epoxies, and other binding means can be used to bind the upper pad 20 to the lower pad 40 in carrying out the spirit of the present invention. These other means of attachment may also be applied to the upper and lower slides 60 and 70, as they attach to the upper and lower pads 20 and 40, or to each other.

Figure 5A:
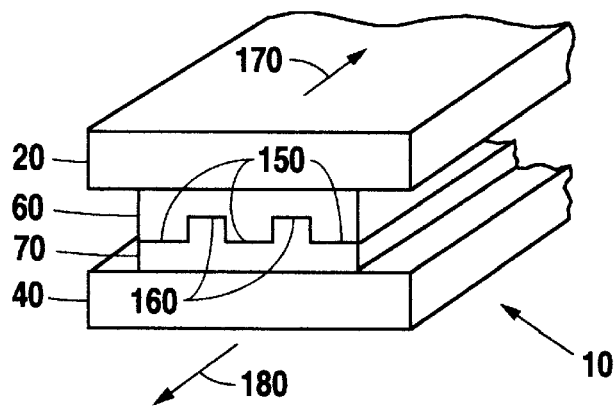
FIGS. 5a, 5b, and 5c illustrate perspective views of alternative embodiments of the present invention utilizing directional shear modulation control.
Figure 5B:
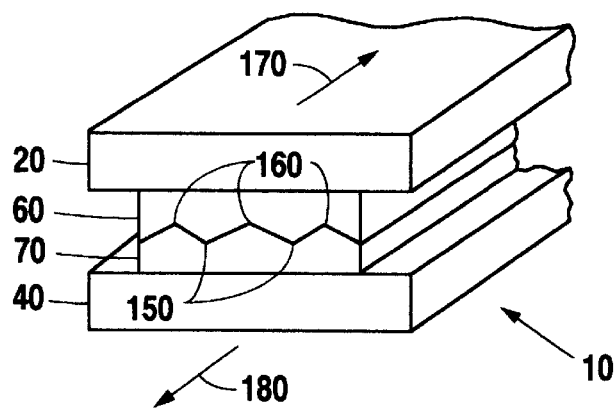
Figure 5C:
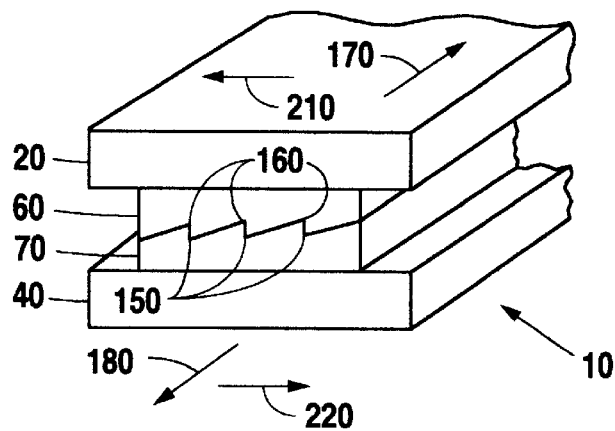

FIGS. 5a, 5b, and 5c illustrate various embodiments of the present invention which provide bidirectional or unidirectional sliding engagement. In the case of FIG. 5a, the upper and lower slides 60 and 70 have been adapted to comprise upper and lower teeth 150 and 160, respectively. Sliding engagement between the upper and lower teeth 150 and 160 is unaffected in the forward and reverse directions 170 and 180, but is constrained to a greater or lesser extent in any other direction by the depth of the teeth. Normally, the degree of restraint in directions other than forward 170 or reverse 180 will be greater than that in the direction of bi-directional sliding engagement (forward and reverse 170 and 180). FIG. 5b illustrates a similar bi-directional sliding engagement between the upper slide 60 and the lower slide 70. However, because triangular-shaped upper teeth 150 and lower teeth 160 are used, the degree of constraint in directions other than forward 170 and reverse 180 will be somewhat less than that experienced with the arrangement shown in FIG. 5a.

FIG. 5c illustrates the shear force modulation system 10 constructed so as to provide bi-directional sliding engagement along one axis, with unidirectional sliding engagement in another. Upper and lower teeth 150 and 160 are formed into a canted sawtooth pattern so as to provide bidirectional sliding engagement along the forward and reverse directions 170 and 180, with unidirectional sliding engagement in the right 220 direction, and increased resistance to movement in the left 210 direction.

Figure 6A:
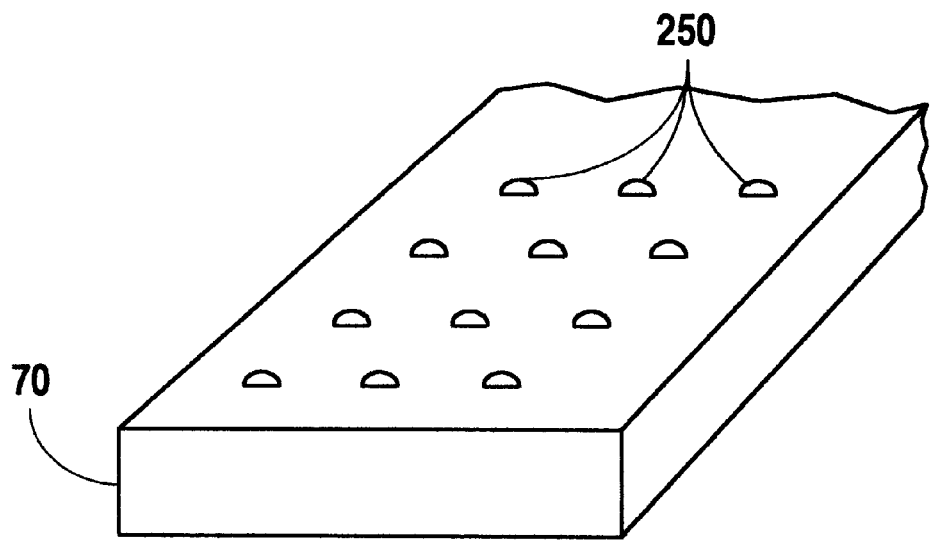
FIGS. 6a and 6b illustrate variations in textured surfaces for the lower slide element of the present invention.
Figure 6B:
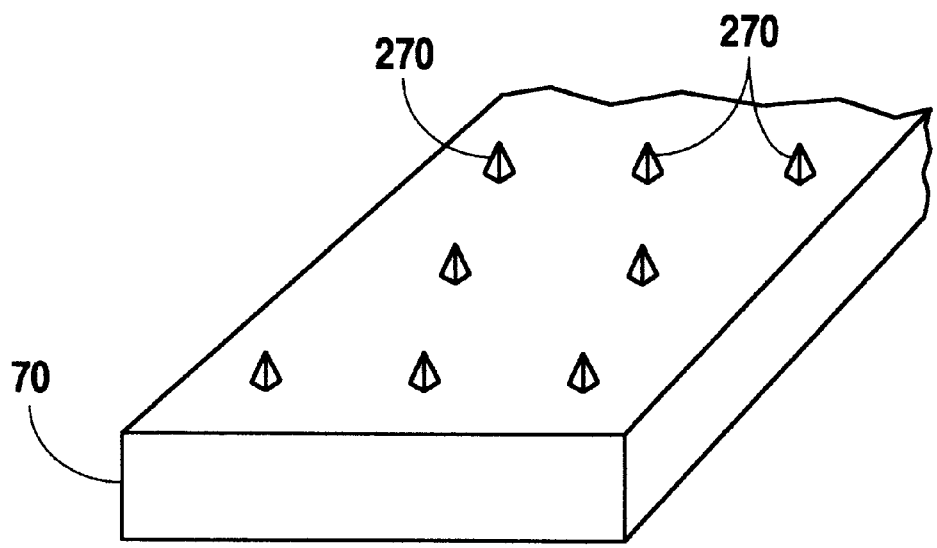

Other methods of modulating the shear forces present between the skin surface and the top surface of the upper pad include controlling friction by placing nodules, such as hemispherical nodules 250 or pyramidal nodules 270, onto the upper and lower slides 60 and 70, as shown in FIGS. 6a and 6b. The quantity, height, and shape of these nodules will affect the coefficient of friction present between the upper and lower slides 60 and 70. Further, in addition to the nodules, or instead of using such nodules, a viscoelastic fluid (not shown) can be permanently retained in between the upper and lower slides 60 and 70, or between the upper and lower pads 20 and 40, to influence the time response of the coefficient of friction existing between the slides 60 and 70. Of course, retaining such a fluid between the slides or pads requires a binding which is also fluid impermeable.

While the shear force modulation system 10 may be used in any number of circumstances where it is desirable to prevent direct contact between a skin surface and a skin abrasive surface, one of the most common applications is that encountered in the insoles of shoes, where the skin, or a sock over the skin, is directly in contact with a skin abrasive surface, i.e., the insole. In this case, the shear force modulation system 10 may be formed into the shape of an insole and laid over the actual insole of the shoe, and used as an orthotic. Of course, the system 10 may also be made so as to constitute the insole itself.

Depending on specific conditions existing on the sole of the foot, a podiatrist may recommend different combinations of shear modulation as effected by the various elements illustrated in FIGS. 1–6. In addition, a wear indicator may be applied to the top surface of the upper pad 35 to provide a visual record of the shear force modulation system 10 effectiveness when used as an insole, or as an orthotic for a shoe. That is, areas of abrasion or high wear will be made visually evident to the user or his podiatrist after a period of time in use. Such areas of wear can be evaluated and changes made in the construction of the shear force modulation system 10 to lessen the wear, and thus skin abrasion, in various regions of the insole. Of course, the wear indicator concept can also be applied in many other circumstances. For example, a liner can be constructed using the shear force modulation system 10 for use around the calf in a walking cast. Areas of abrasion or rubbing will soon be made evident by the wear indicator and adjustments in the construction of the liner can then be made so as to lessen the degree of abrasion or replace the liner/insole with a new one.

When used as an insole, the shear force modulation system 10 in the present invention can be constructed specifically to reduce both shear stress and peak pressures. This can be accomplished by fabricating the upper and/or lower pads 20 and 40 from dense foam, or other materials which are well known in the art and used to reduce such pressure. For diabetic patients, reducing both shear and peak pressures in the plantar aspect of the foot, which is prone to ulceration, will have an immediate impact on improving their quality of life.

The shear force modulation system 10 of the present invention may be considered as a bi-laminar shear reduction pad that decreases shear on its upper surface (i.e., the top surface of the upper pad 35) by permitting relative movement between the upper and lower surfaces (i.e., the upper pad top surface 35 and the lower pad bottom surface 45). The system 10 is normally constructed by placing two layers in contact (i.e., the upper and lower slides 60 and 70), which can move relative to each other and typically have a low coefficient of friction existing between them. The magnitude of shear reduction can be adjusted by using dry lubricants having varying coefficients of friction between slides 60 and 70. The sliding contact between the upper and lower slides 60 and 70 can be limited to a predetermined displacement by the use of connectors 110. Connectors can also be used to increase or decrease compliance between the upper and lower pads. Also shear reduction can be made to depend on direction and velocity of relative movement. Finally, as mentioned above, the upper surface of the pad can be coated with a material that is sensitive to shear forces and will indicate if the pad is performing properly. Such an indicator can be effected by the application of ink to the top surface of the upper pad. Other methods of wear indication are well known in the art.

The magnitude of shear reduction can be varied by using a lower pad 40 of varying density or rigidity. Such construction will allow variation over numerous regions of the normal stress (i.e., load contract area) which will change the amount of shear force developed between the upper and lower pads 20 and 40. The amount of shear modulation can be adjusted, as mentioned previously, by restricting the relative displacement of the upper and lower pads using mechanical limits or stops, such as the connectors 110 illustrated in FIG. 2. The directional dependency of the system 10 for shear reduction can be modified by using textured, low friction coatings (which may be applied to, or comprise, the upper and lower slides 60 and 70) so that the texture profile is aligned to permit easy movement in specified directions (e.g. bidirectional or unidirectional). The velocity dependence, or time response to shear forces, of the system 10 can be modified using viscoelastic fluids between the upper and lower slides 60 and 70. The shear force modulation in this case depends on the relative velocity between the upper and lower slides 60 and 70. Such a viscoelastic fluid can be used in conjunction with the texturization of the upper and lower slides to accomplish further performance modification of the shear force response in the system 10.

While the upper and lower pads 20 and 40 have been described as pads, and will be used as such in most cases, they may also comprise thin sheets of material or cloth which would not normally be characterized as "padding". Further, while the modulation of shear force is normally intended to reduce such forces by the invention, the system 10 can also be constructed so as to increase shear forces, as may be desired by sprinters during an athletic competition in their insoles, or at the forefoot portions of their shoes. Similar athletic performance improvements can be realized by the application of the shear force modulation system 10 to the insides of gloves for golfers or football players, so as to provide increased friction and better results under conditions which degrade the ability of the athlete to grip golf clubs, footballs, etc. In other words, the coefficient of friction between the skin surface and the upper pad 20 may be greater or lesser than the coefficient of friction between the lower pad 40, and the skin abrasive surface. Likewise, the coefficient of friction between the upper and lower slides 60 and 70 may be greater or lesser than the coefficients of friction between the skin surface and the upper pad 20, and the lower pad 40 and the skin abrasive surface, depending on the desired characteristics of performance for a specific implementation of the shear force modulation system 10.

The upper and lower pads may be made of any number of materials, such as PLASTIZOTE™, which typically provide higher levels of friction and some comfort when applied proximate to a skin surface. Likewise, the upper and lower slides 60 and 70 may be fabricated from materials having a low coefficient of friction, such as TEFLON® or other materials, such as polymers, lubricious fluids, or a combination of these. The upper and lower slides 60 and 70 may comprise discrete sheets of material, as shown in the figures, or they may also comprise layers of a substance, such as TEFLON®, which are applied as a coating, to the upper and lower pads 20 and 40.

Although the present invention is described in terms of a preferred exemplary embodiment with specific reference to use as an insole, it is also applicable to other areas of art wherein skin surfaces may be abraded by contact with their environment. These include reducing shear at the dorsal aspect of toes by incorporating the shear force modulation system as an interior liner for a shoe, alleviating friction between the chair pad and skin interface of a wheelchair by incorporating the shear force modulation system as a liner on the pad, and use of the shear force modulation system to decrease shear forces at the skin contact points of a patient in a bed by incorporating a shear force modulation system liner on the top surface of the bed. Similarly, the present invention also includes use to reduce or eliminate the abrasive effects of one inanimate object which rubs against another (i.e., no skin surface is involved). For example, optical components, such as lenses, are often susceptible to damage via abrasion, even when they are packed for shock protection during shipping. To reduce or eliminate such abrasion, the present invention may be used by interposing the pads and slides of the shear force modulation system between proximate objects which tend to wear against each other due to their relative motion. Such uses are intended to fall within the scope of the following claims. Other aspects, features and advantages of the present invention may be obtained from a study of this disclosure in the drawings, along with the appended claims.

What I claim is:

1. A shear force modulation system for modulating shear forces between a skin surface and a skin abrasive surface, comprising:

an upper pad having a top surface and a bottom surface spaced from the top surface of the upper pad;

an upper slide having a top surface and a bottom surface, the top surface of the upper slide attached to the bottom surface of the upper pad;

a lower slide having a top surface and a bottom surface, the top surface of the lower slide slidably contacting the bottom surface of the upper slide; and a lower pad having a top surface and a bottom surface, the top surface of the lower pad attached to the bottom surface of the lower slide, and the bottom surface of the lower pad being spaced from the top surface of the lower pad, wherein the upper pad is attached to the lower pad by an elastic connector.

2. The shear force modulation system of claim 1, wherein the elastic connector is a viscoelastic connector.

3. The shear modulation system of claim 1, wherein the upper and lower slides are attached to the upper and lower pads, respectively by elastic connectors.

4. The shear force modulation system of claim 1, wherein the upper and lower slides are attached to the upper and lower pads, respectively by viscoelastic connectors.

5. The shear force modulation system of claim 1, wherein the upper and lower slides are attached to the upper and lower pads, respectively, by non-elastic connectors.

6. The shear force modulation system of claim 1, wherein the upper pad is attached to the upper slide by an elastic connector.

7. The shear force modulation system of claim 1, wherein the upper pad is attached to the upper slide by a viscoelastic connector.

8. The shear force modulation system of claim 1, wherein the upper pad is attached to the upper slide by a non-elastic connector.

9. The shear force modulation system of claim 1, wherein the lower pad is attached to the lower slide by elastic connectors.

10. The shear force modulation system of claim 1, wherein the lower pad is attached to the lower slide by viscoelastic connectors.

11. The shear force modulation system of claim 1, wherein the lower pad is attached to the lower slide by non-elastic connectors.

12. The shear force modulation system of claim 1, wherein a first coefficient of friction between the skin surface and the top surface of the upper pad is greater than a second coefficient of friction between the bottom surface of the upper slide and the top surface of the lower slide.

13. The shear force modulation system of claim 12, wherein a third coefficient of friction between the bottom surface of the lower pad and the skin abrasive surface is greater than said second coefficient of friction.

14. The shear force modulation system of claim 12, wherein a third coefficient of friction between the bottom surface of the lower pad and the skin abrasive surface is less than said second coefficient of friction.

15. The shear force modulation system of claim 1, wherein a first coefficient of friction between the skin surface and the top surface of the upper pad is less than a second coefficient of friction between the bottom surface of the upper slide and the top surface of the lower slide.

16. The shear force modulation system of claim 15, wherein a third coefficient of friction between the bottom surface of the lower pad and the skin abrasive surface is greater than said second coefficient of friction.

17. The shear force modulation system of claim 15, wherein a third coefficient of friction between the bottom surface of the lower pad and the skin abrasive surface is less than said second coefficient of friction.

18. The shear force modulation system of claim 1, wherein a viscoelastic fluid is continuously maintained between said upper and lower pads.

19. The shear force modulation system of claim 1, wherein the lower surface of the upper slide and the upper surface of the lower slide are adapted for bidirectional slidable engagement.

20. The shear force modulation system of claim 1, wherein the lower surface of the upper slide and the upper surface of the lower slide are adapted for unidirectional slidable engagement.

21. The shear force modulation system of claim 1, wherein a first group of nodules are fixedly attached to the top surface of the bottom slide.

22. The shear force modulation system of claim 21, wherein a second group of nodules are fixedly attached to the bottom surface of the top slide.

23. The shear force modulation system of claim 1, wherein a second group of nodules are fixedly attached to the bottom surface of the top slide.

24. The shear force modulation system of claim 1, wherein a first coefficient of friction within a first region between the bottom surface of the upper slide and the top surface of the lower slide is greater than a second coefficient of friction within a second region between the bottom surface of the upper slide and the top surface of the lower slide.

25. The shear force modulation system of claim 1, wherein a first coefficient of friction during movement along a first path between the bottom surface of the upper slide and the top surface of the lower slide is greater than a second coefficient of friction during movement along a second path between the bottom surface of the upper slide and the top surface of the lower slide.

26. The shear force modulation system of claim 1, wherein the time required to develop a predetermined magnitude of a first coefficient of friction within a first region between the bottom surface of the upper slide and the top surface of the lower slide is greater than the time required to develop a predetermined magnitude of a second coefficient of friction within a second region between the bottom surface of the upper slide and the top surface of the lower slide.

27. The shear force modulation system of claim 1, wherein the upper slide is attached to the upper pad by coating.

28. The shear force modulation system of claim 1, wherein the lower slide is attached to the lower pad by coating.

29. The shear force modulation system of claim 1, wherein the upper slide is attached to the upper pad by adhesive.

30. The shear force modulation system of claim 1, wherein the lower slide is attached to the lower pad by adhesive.

* * * * *